(12) United States Patent
Tahira et al.

(10) Patent No.: US 9,731,341 B2
(45) Date of Patent: Aug. 15, 2017

(54) FORGED CRANKSHAFT AND METHOD FOR MANUFACTURING THE FORGED CRANKSHAFT

(71) Applicant: NIPPON STEEL & SUMITOMO METAL CORPORATION, Tokyo (JP)

(72) Inventors: Hiroaki Tahira, Kizugawa (JP); Kisung Kim, Yao (JP); Junichi Okubo, Amagasaki (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 102 days.

(21) Appl. No.: 14/647,472

(22) PCT Filed: Dec. 9, 2013

(86) PCT No.: PCT/JP2013/007217
§ 371 (c)(1),
(2) Date: May 27, 2015

(87) PCT Pub. No.: WO2014/091738
PCT Pub. Date: Jun. 19, 2014

(65) Prior Publication Data
US 2015/0321245 A1 Nov. 12, 2015

(30) Foreign Application Priority Data
Dec. 12, 2012 (JP) ................. 2012-271222

(51) Int. Cl.
*B21K 1/08* (2006.01)
*B21J 5/12* (2006.01)
(Continued)

(52) U.S. Cl.
CPC ................. *B21K 1/08* (2013.01); *B21J 5/025* (2013.01); *B21J 5/12* (2013.01); *F16C 3/08* (2013.01);
(Continued)

(58) Field of Classification Search
CPC ..... B21K 1/08; B21J 5/12; B21J 5/025; F16C 3/08; F16C 2220/46; F16C 2204/64; Y10T 74/2173
See application file for complete search history.

(56) References Cited

U.S. PATENT DOCUMENTS 2,911,705 A * 11/1959 Vom Bovert ............ B21K 1/08
29/6.01
9,239,075 B2 * 1/2016 Kim .......................... C21D 9/30
(Continued)

FOREIGN PATENT DOCUMENTS

JP 05-000349 1/1993
JP 11-320019 11/1999
(Continued)

Primary Examiner — John C Hong
(74) Attorney, Agent, or Firm — Clark & Brody

(57) ABSTRACT

A forged crankshaft (1) includes a carbon steel containing S, wherein in a portion corresponding to a machined outer circumferential surface of a shaft part such as journals (J), crank pins (P), a front part (Fr), and a flange (Fl), a ratio x/y of an area rate x of sulfide in a position (X) corresponding to a parting surface of a die for finish forging to an area rate y of sulfide in a position (Y) corresponding to a bottom of a die impression of the die for finish forging is equal to or lower than 1.5. The forged crankshaft (1) can avoid an occurrence of machined surface cracks on the journals (J) and the crank pins (P) after the outer circumferential surface is machined.

4 Claims, 10 Drawing Sheets

(51) Int. Cl.
*F16C 3/08* (2006.01)
*B21J 5/02* (2006.01)
(52) U.S. Cl.
CPC ...... *F16C 2204/64* (2013.01); *F16C 2220/46* (2013.01); *Y10T 74/2173* (2015.01)

(56) References Cited

U.S. PATENT DOCUMENTS

2015/0231689 A1\* 8/2015 Okubo .................. B21K 1/08
29/6.01
2015/0314365 A1\* 11/2015 Okubo .................. B21K 1/08
72/360

FOREIGN PATENT DOCUMENTS

| JP | 2000-094087 | 4/2000 |
| JP | 2003-253384 | 9/2003 |
| JP | 2012-161819 | 8/2012 |
| JP | 2012-170974 | 9/2012 |

\* cited by examiner

FIG. 4
Preform Blank
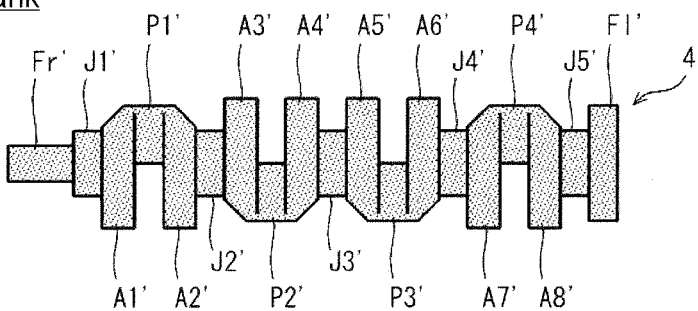
⇩ Forming
Blank for Finish Forging
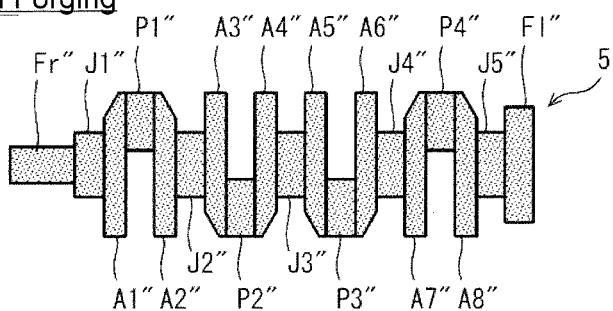
FIG. 5
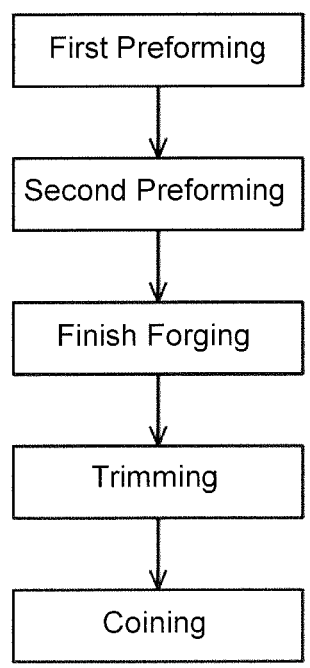

FIG. 11
Example of Present Invention (Test No. 2)
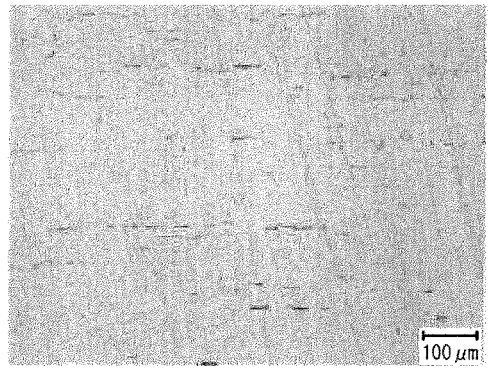
Comparative Example (Test No. 6)
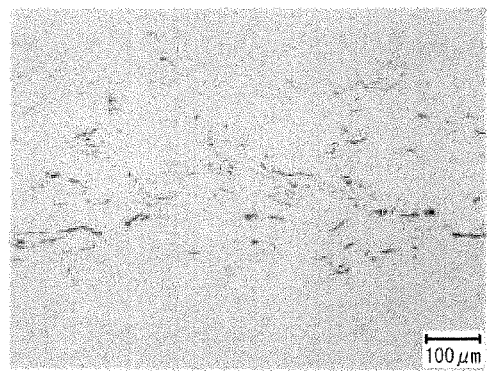

FORGED CRANKSHAFT AND METHOD FOR MANUFACTURING THE FORGED CRANKSHAFT

TECHNICAL FIELD

The present invention relates to a crankshaft (hereinafter also referred to as a "forged crankshaft") manufactured by hot forging. In particular, the present invention pertains to a forged crankshaft superior in machinability and cracking resistance and to a method for manufacturing the forged crankshaft.

BACKGROUND ART

A crankshaft is a principal component of a reciprocating engine, which obtains power by converting reciprocating motion of pistons to rotary motion. Generally, there are two types of crankshafts: those that are manufactured by forging and those that are manufactured by casting. For engines of automobiles such as passenger cars, freight cars, and specialized work vehicles, particularly, for multiple cylinder engines having two or more cylinders, their crankshafts are required to have high strength and stiffness and therefore forged crankshafts more capable of meeting the request are widely used. Further, forged crankshafts are also used in multiple cylinder engines of motorcycles, agricultural machines, marine vessels, and the like.

In general, forged crankshafts for multiple cylinder engines are manufactured by using, as a starting material, a billet having a circular or square cross section and having a constant cross-sectional area along the entire length, and subjecting the billet to the steps of preforming, die forging, trimming, and coining in the mentioned order (for example, refer to Patent Literatures 1 to 3). The preforming step includes roll forming and bending, and the die forging step includes block forging and finish forging.

FIG. 1 is a schematic diagram illustrating a typical conventional process for manufacturing a forged crankshaft. FIG. 2 is a schematic diagram illustrating an example of a conventional forged crankshaft, FIG. 2(a) is a plan view, FIG. 2(b) is a side view, and FIG. 2(c) is a radial cross-sectional view of a journal representative of a shaft part.

A crankshaft 1 illustrated by examples in FIGS. 1 and 2 is intended to be mounted in a 4-cylinder engine. It is a 4-cylinder 8-counterweight crankshaft that includes: five journals J1 to J5; four crank pins P1 to P4; a front part Fr, a flange Fl, and eight crank arms (hereinafter simply referred to as "arms") A1 to A8 that connect the journals J1 to J5 and the crank pins P1 to P4 to one another, wherein each of the eight arms A1 to A8 has a balance weight. Hereinafter, when the journals J1 to J5, the crank pins P1 to P4, and the arms A1 to A8 are each collectively referred to, a reference character "J" is used for the journals, a reference character "P" for the crank pins, and a reference character "A" for the arms. Among these portions, the journals J, the crank pins P, the front part Fr, and the flange Fl are all column-shaped shaft parts.

According to the manufacturing method shown in FIG. 1, the forged crankshaft 1 is manufactured in the following manner. Firstly, a billet 2 shown in FIG. 1(a), which has been previously cut to a predetermined length, is heated by an induction heater or a gas atmosphere furnace and then is subjected to roll forming. In the roll forming step, for example, the billet 2 is rolled and reduced in cross section by grooved rolls to distribute its volume in the longitudinal direction; thereby, a rolled blank 103, which is an intermediate material, is formed (see FIG. 1(b)). Next, in the bending step, the rolled blank 103 obtained by roll forming is partially pressed in a press in a direction perpendicular to the longitudinal direction to distribute its volume; thereby, a bent blank 104, which is a secondary intermediate material, is formed (see FIG. 1(c)).

Then, in the block forging step, the bent blank 104 obtained by bending is press forged with a pair of upper and lower dies; thereby, a forged blank 105 having a general shape of a crankshaft (forged final product) is formed (see FIG. 1(d)). Thereafter, in the finish forging step, the block forged blank 105 obtained by block forging is provided and processed by press forging with a pair of upper and lower dies; thereby, a forged blank 106 having a shape coinciding with the shape of the crankshaft is formed (see FIG. 1(e)). In the block forging and finish forging steps, excess material flows out as a flash from between parting surfaces of the dies that oppose each other. Therefore, each of the block forged blank 105 and the finish forged blank 106 has a large flash 105a, 106a around the formed shape of the crankshaft.

In the trimming step, the finish forged blank 106 with the flash 106a, obtained by finish forging, is held by dies from above and below and the flash 106a is trimmed by a cutting die. In this manner, the forged crankshaft 1 is obtained as shown in FIG. 1(f) and FIG. 2. In the coining step, principal parts of the forged crankshaft 1, from which the flash has been removed, e.g., shaft parts such as the journals J, the crank pins P, the front part Fr, and the flange Fl, and in some cases the arms A, are slightly pressed with dies from above and below and are corrected to a desired size and shape. Thus, the forged crankshaft 1 is manufactured.

The manufacturing process shown in FIG. 1 is applicable not only to a 4-cylinder 8-counterweight crankshaft as illustrated by an example, but also to a 4-cylinder 4-counterweight crankshaft in which, among 8 arms A, the leading first arm A1, the trailing eighth arm A8, and the two central, fourth and fifth arms A4, A5 have balance weights. Also, the same manufacturing process can be applied to crankshafts that are to be mounted in a 3-cylinder engine, an inline 6-cylinder engine, a V-type 6-cylinder engine, an 8-cylinder engine, and the like. It is noted that, when adjustment of the placement angle of the crank pins is necessary, a step of twisting is added after the trimming step.

As shown in FIG. 2, a flash is generated in the aforementioned die forging step and the flash is removed in the trimming step; therefore, a flash line 107 as a trace after the trimming step emerges around the entire circumference of the forged crankshaft 1. A radial cross-sectional shape of the journals J, the crank pins P, the front part Fr, and the flange Fl which are shaft parts is a substantially circular shape of the combination of semicircles symmetric to each other in a state where the flash line 107 is positioned between the semicircular portions (see FIG. 2(c)). The semicircular portions are respectively formed by semicircular die impressions of the pair of upper and lower dies in the finish forging step and the position of the flash line 107 corresponds to the positions of the parting surfaces of the upper and lower dies (see a dashed line of FIG. 2(c)).

Such forged crankshaft 1 is subjected to various machining processes, and may be subjected to a heat treatment in order to function as a crankshaft to be mounted in an engine. For example, an outer circumference of each of the journals J, the crank pins P, the front part Fr, and the flange Fl which are shaft parts is processed by cutting to have a predetermined outer diameter (see a two-dot chain line of FIG. 2(c)). In particular, the outer circumferences of the journals J and the crank pins P are further processed by grinding and are finished to have predetermined outer diameters and surface roughness. The journals, each outer circumference of which is processed by machining are supported via a slide bearing bush by an engine block. Likewise, the crank pins are connected by slide bearing bushes to end portions of connecting rods to which pistons are connected.

Further, the journals and the crank pins slide with the slide bearing bushes, therefore being required to have wear resistance. Therefore, the outer circumferences of the journals and the crank pins are often subjected to induction heating (IH) after cutting and before grinding.

CITATION LIST

Patent Literature

Patent Literature 1: Japanese Patent Application Publication No. H05-000349
Patent Literature 2: Japanese Patent Application Publication No. H11-320019
Patent Literature 3: Japanese Patent Application Publication No. 2003-253384

SUMMARY OF INVENTION

Technical Problem

Incidentally, in the journal and the crank pin, each outer circumference of which is processed by machining, grinding cracks or IH cracks (hereinafter also referred to as "machined surface cracks") may be generated due to tensile residual stress generated on the outer circumferences by a grinding process or an induction heating process. Conventionally, in a case where machined surface cracks are generated, conditions of the grinding process or the induction heating process are adjusted to address the cracks. However, the adjustment of these conditions is an extremely complex operation and may vary the outer diameters or surface roughness of the journal and the crank pin and characteristics of hardened layers by quenching; therefore, there are limitations. As a result, generation of the machined surface cracks cannot be sufficiently prevented and progressive countermeasures are desired.

The present invention has been made in view of the foregoing problems, and it is intended to provide a forged crankshaft which can prevent machined surface cracks from being generated on a journal and a crank pin after outer circumferences thereof are machined, and a method for manufacturing the crankshaft.

Solution to Problem

In order to attain the foregoing purpose, the inventors of the present invention have obtained the following findings (a) to (e) after conducting various tests and having a series of concentrated studies.

(a) In general, a carbon steel containing S (sulfide) is applied as a starting material of the forged crankshaft. This is for securing an appropriate machinability in machining the forged crankshaft.

(b) Machined surface cracks generated at a shaft part of a conventional forged crankshaft are investigated in detail. Results of the investigation reveal that the occurrence of machined surface cracks is limited to a position on a flash line, i.e., a position corresponding to a parting surface of a die for finish forging and that no machined surface crack is generated in other positions away from the flash line, i.e., in a position among the positions, which corresponds to a bottom (hereinafter also referred to as "a die bottom") of a die impression of the die for finish forging.

(c) Such occurrence of machined surface cracks can be explained from the following reasons. Various inclusions are dotted within a billet as a starting material of the forged crankshaft. As in the finding (a) in which the carbon steel containing S is applied, most of the inclusions is MnS (manganese sulfide). In a die forging step in manufacturing the forged crankshaft, the steel is extremely pressed and noticeably flows at a portion near the parting surface of the die. Therefore, the MnS inclusions are surely extended to be accumulated in the flash flowing out from between the parting surfaces of the dies and are also accumulated in the position corresponding to a parting surface of the shaft part of the forged crankshaft.

Therefore, the MnS inclusions are congested in the position corresponding to the parting surface of the shaft part of the forged crankshaft. These congested MnS inclusions are highly susceptible to cracking. In addition, in a case where the MnS inclusions are exposed on a machined outer circumferential surface of the shaft part, machined surface cracks are likely to occur from the congested MnS inclusions.

Meanwhile, in the position away from the flash line on the shaft part of the forged crankshaft, in particular, in the position corresponding to the die bottom, the steel slightly flows in the die forging step. Therefore, the MnS inclusions are maintained in a moderately dotted state and susceptibility to cracking is low. In addition, even in a case where the MnS inclusions are exposed on the machined outer circumferential surface of the shaft part, machined surface cracks do not tend to occur.

(d) As seen from the findings (b) and (c), in a case where the MnS inclusions are not congested but they are moderately dotted even in the position corresponding to the parting surface of the shaft part of the forged crankshaft, the machined surface cracks do not tend to occur. The distribution state of the MnS inclusions can be organized on the basis of an indication of an area rate (hereinafter also referred to as "an area rate of sulfide") occupied by the MnS inclusions within a certain area. In addition, as demonstrated in an embodiment described below, in a portion corresponding to a machined outer circumferential surface of the shaft part, an area rate of sulfide in the position corresponding to the parting surface of the die for finish forging is defined as x and an area rate of sulfide in the position corresponding to the bottom of the die impression of the die for finish forging defined as y. In the forged crankshaft in which these area rates are comparable and a ratio x/y of the area rate x to the area rate y is 1.5 or lower, no machined surface crack is generated.

(e) In the forged crankshaft shown in the finding (d), no flash may be generated in its manufacturing process or flashes may be slightly seen even when generated. In a case where such forged crankshaft is a forged crankshaft for a multiple cylinder engine, it can be manufactured by using a manufacturing process in which a forming apparats described below is applied.

The present invention is accomplished on the basis of the foregoing findings (a) to (e) and the scope is present in the following forged crankshaft and method for manufacturing the forged crankshaft.

A forged crankshaft according to an embodiment of the present invention includes a carbon steel containing S, wherein in a portion corresponding to a machined outer circumferential surface of a shaft part, a ratio x/y of an area rate x of sulfide in a position corresponding to a parting surface of a die for finish forging to an area rate y of sulfide in a position corresponding to a bottom of a die impression of the die for finish forging is equal to or lower than 1.5.

Preferably, the forged crankshaft includes the carbon steel containing C of 0.30% to 0.60% by mass and S of 0.01% to 0.30% by mass.

Preferably, the forged crankshaft is a forged crankshaft for a multiple cylinder engine.

In a case where the forged crankshaft is a forged crankshaft for a multiple cylinder engine, the forged crankshaft is manufactured through the successive following steps: a first preforming step; a second preforming step; and a finish forging step.

The first preforming step is for forming a preform blank having a crankshaft shape, the preform blank formed to include: rough journal portions having an axial length equal to an axial length of journals of the forged crankshaft; rough crank pin portions having an axial length equal to an axial length of crank pins of the forged crankshaft and having a smaller amount of eccentricity in an eccentric direction perpendicular to the axial direction than an amount of eccentricity of the crank pins of the forged crankshaft; and rough crank arm portions having an axial thickness greater than an axial thickness of crank arms of the forged crankshaft.

The second preforming step is for forming a blank for finish forging by using a forming apparatus. The forming apparatus includes stationary journal dies, movable journal dies, and crank pin dies, described below.

The stationary journal dies are disposed at locations corresponding to a location of one of the rough journal portions of the preform blank, and the stationary journal dies are configured to hold and retain the rough journal portion therebetween in the eccentric direction perpendicular to the axial direction, while being in contact with side surfaces of corresponding ones of the rough crank arm portions, the corresponding ones of the rough crank arm portions connecting with the rough journal portion.

The movable journal dies are disposed at locations corresponding to locations of the rough journal portions excluding the rough journal portion to be held by the stationary journal dies, and the movable journal dies are configured to hold and retain the rough journal portions therebetween in the eccentric direction perpendicular to the axial direction, and configured to move axially toward the stationary journal dies, while being in contact with side surfaces of corresponding ones of the rough crank arm portions, the corresponding ones of the rough crank arm portions each connecting with a corresponding one of the rough journal portions.

The crank pin dies are disposed at locations corresponding to locations of the rough crank pin portions, and the crank pin dies are configured to be brought into contact with the respective rough crank pin portions at inner sides thereof, and configured to move axially toward the stationary journal dies and in the eccentric direction perpendicular to the axial direction, while being in contact with side surfaces of corresponding ones of the rough crank arm portions, the corresponding ones of the rough crank arm portions each connecting with a corresponding one of the rough crank pin portions.

In the second preforming step, the rough journal portions are held and retained by the stationary journal dies and the movable journal dies, the rough crank pin portions are contacted by the crank pin dies, the movable journal dies are moved axially, and the crank pin dies are moved axially and in the eccentric direction, thereby the rough crank arm portions are compressed in the axial direction so as to reduce the thickness thereof to the thickness of the crank arms of the forged crankshaft, and the rough crank pin portions are pressed in the eccentric direction so as to increase the amount of eccentricity thereof to the amount of eccentricity of the crank pins of the forged crankshaft.

The finish forging step is for finish forging the blank for finish forging by using a pair of upper and lower dies to form a finished product in which a final shape of the forged crankshaft is formed.

Advantageous Effects of Invention

According to the forged crankshaft of the present invention, the area rate x of sulfide in the position corresponding to the paring surface of the die for finish forging is comparable to the area rate y of sulfide in the position corresponding to the bottom of the die impression of the die for finish forging; therefore, susceptibility of the journals and the crank pins to cracking can be lowered after the outer circumferential surface is machined, and an occurrence of machined surface cracks due to grinding process or induction heating process can be avoided.

BRIEF DESCRIPTION OF DRAWINGS

FIG. 2(a) is a plan view, FIG. 2(b) is a side view, and FIG. 2(c) is a radial cross-sectional view of a journal representative of shaft parts.

FIG. 3(a) is a plan view, FIG. 3(b) is a side view, and FIG. 3(c) is a radial cross-sectional view of a journal representative of shaft parts.

FIG. 4 is a plan view schematically illustrating shapes of a preform blank to be processed by a forming apparatus in a manufacturing process of the forged crankshaft of the present invention and a blank for finish forging, which is formed from the preform blank.

FIG. 5 is a schematic diagram illustrating the manufacturing process of the forged crankshaft of the present invention.

FIG. 11 are microscopic observation pictures of positions corresponding to parting surfaces of dies of journals, respectively, in an example of the present invention and a comparison example.

DESCRIPTION OF EMBODIMENTS

Hereinafter, an embodiment of a forged crankshaft of the present invention and a method for manufacturing the forged crankshaft will be described in detail.

1. Characteristics of the Forged Crankshaft

Figure 3:
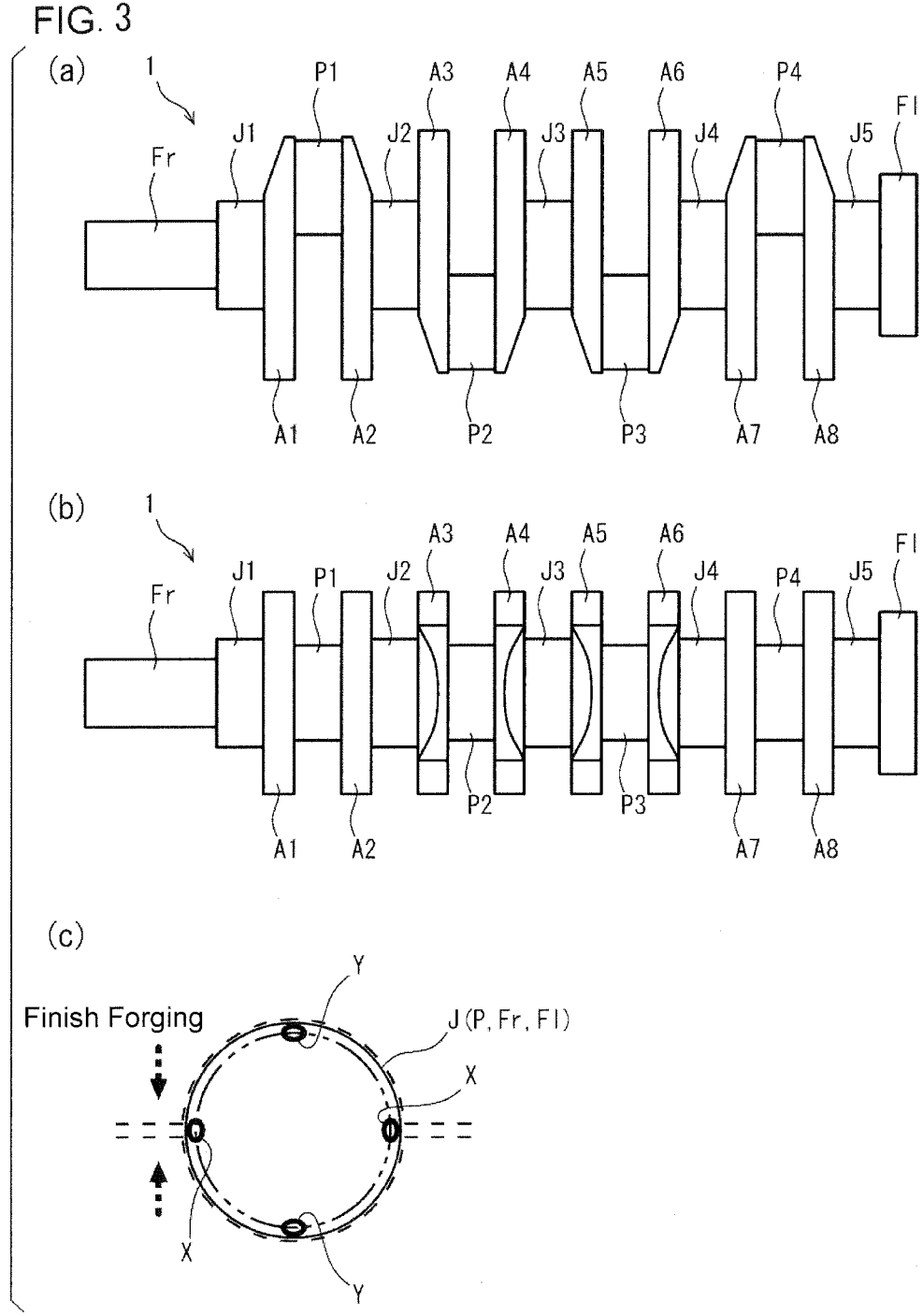
FIG. 3 is a schematic diagram illustrating an example of a forged crankshaft of the present invention.

FIG. 3 is a schematic diagram illustrating an example of the forged crankshaft of the present invention, FIG. 3(a) is a plan view, FIG. 3(b) is a side view, and FIG. 3(c) is a radial cross-sectional view of a journal representative of shaft parts. In FIG. 3(c), for convenience of explanation, the shape of a pair of upper and lower dies for finish forging is indicated by a dashed line and an outer circumference of a shaft part, i.e., a journal J, a crank pin P, a front part Fr, and a flange Fl, which is to be machined, is indicated by a two-dot chain line. Further, a 4-cylinder 8-counterweight crankshaft is illustrated by an example in FIG. 3.

As shown in FIG. 3, a forged crankshaft 1 of the present invention exhibits no flash line, or flash lines are slightly seen even when generated. No flash line is generated in a manufacturing process of the forged crankshaft, or a few flash lines are seen even when generated in the manufacturing process. Further, the forged crankshaft 1 of the present invention is formed of carbon steel containing S and is manufactured from a billet of this carbon steel with S, as a starting material. The carbon steel with S includes C: 0.30% to 0.60% by mass and S: 0.01% to 0.30% by mass as its representative compositions. Here, a reason why a range of the content of C is set from 0.30% to 0.60% is because strength and hardenability of the crankshaft need to be secured and deteriorations of toughness and machinability of the crankshaft need to be prevented. A lower limit of the content of C is preferably 0.35% or higher, and further preferably, the lower limit is 0.37% or higher. Meanwhile, an upper limit of the content of C is preferably 0.58% or lower, and further preferably, the upper limit is 0.55% or lower.

A reason why the content of S is set from 0.01% to 0.30% is as follows. In a case where the content of S is lower than 0.01%, an appropriate machinability cannot be secured in the event of machining the forged crankshaft. From the viewpoint of machinability, the larger the content of S is, the better it is. If the content of S is too large exceeding 0.30%, machined surface cracks tends to occur, and also manufacturing (continuously casting) the billet is substantively difficult. As a result, a lower limit of the content of S is 0.01% or higher, and further preferably, the lower limit is 0.03% or higher, and more even preferably, 0.05% or higher. Meanwhile, an upper limit of the content of S is 0.30% or lower.

Further, the forged crankshaft 1 of the present invention includes the following characteristics in a portion corresponding to a surface (see the two-dot chain line in FIG. 3(c)) of the shaft part after the outer circumference thereof is machined. When an area rate of sulfide in a position (position enclosed by a heavy line indicated by symbol X in FIG. 3 (c)) corresponding to a parting surface of the die for finish forging is x and an area rate of sulfide in a position (position enclosed by a heavy line indicated by symbol Y in FIG. 3 (c)) corresponding to a die bottom of the die for finish forging is y, the area rates X, Y of sulfide are comparable and their ratio x/y is equal to or lower than 1.5. The position X corresponding to the parting surface corresponds to a position on a flash line of the conventional forged crankshaft.

The area rate of sulfide mentioned here means an area percentage (%) occupied by a MnS inclusion in a certain area on an axial cross-sectional surface in the corresponding position, and it is an index of a distribution state of the MnS inclusion in the corresponding position. That is, the larger the area rate of sulfide is, the more the MnS inclusion is concentrated, and the smaller the area rate of sulfide is, the more the MnS inclusion is dispersed.

In the forged crankshaft 1 where the area rate x of sulfide in the position X corresponding to the parting surface is comparable to the area rate y of sulfide in the position Y corresponding to the die bottom and the ratio x/y is equal to or lower than 1.5, the MnS inclusion is also moderately dispersed in the position X corresponding to the parting surface in the shaft part, with the same level as in the position Y corresponding to the die bottom, without being concentrated. Accordingly, after the outer circumference is machined, the journal and the crank pin are lowly susceptible to cracking. Therefore, an occurrence of machined surface cracks due to a grinding process or an induction heating process can be avoided.

In a case where the forged crankshaft 1 described above is a forged crankshaft, for example, for a multiple cylinder engine, the following manufacturing method is applied and thereby the forged crankshaft 1 can be manufactured.

2. Method for Manufacturing the Forged Crankshaft

The present invention is based on the premise that, in the case of a forged crankshaft for a multiple cylinder engine, finish forging is performed in the manufacturing process. A forming apparatus described below is applied in a process prior to finish forging in order to form a blank for finish forging, which is provided for the finish forging step, from a preform blank.

2-1. Preform Blank to be Processed and Blank for Finish Forging Formed from the Preform Blank FIG. 4 is a plan view schematically illustrating shapes of a preform blank to be processed by the forming apparatus in the manufacturing process of the forged crankshaft of the present invention and a blank for finish forging, which is formed from the preform blank. FIG. 4 illustrates a preform blank and a blank for finish forging in the case of manufacturing a 4-cylinder 8-counterweight crankshaft.

Figure 1:
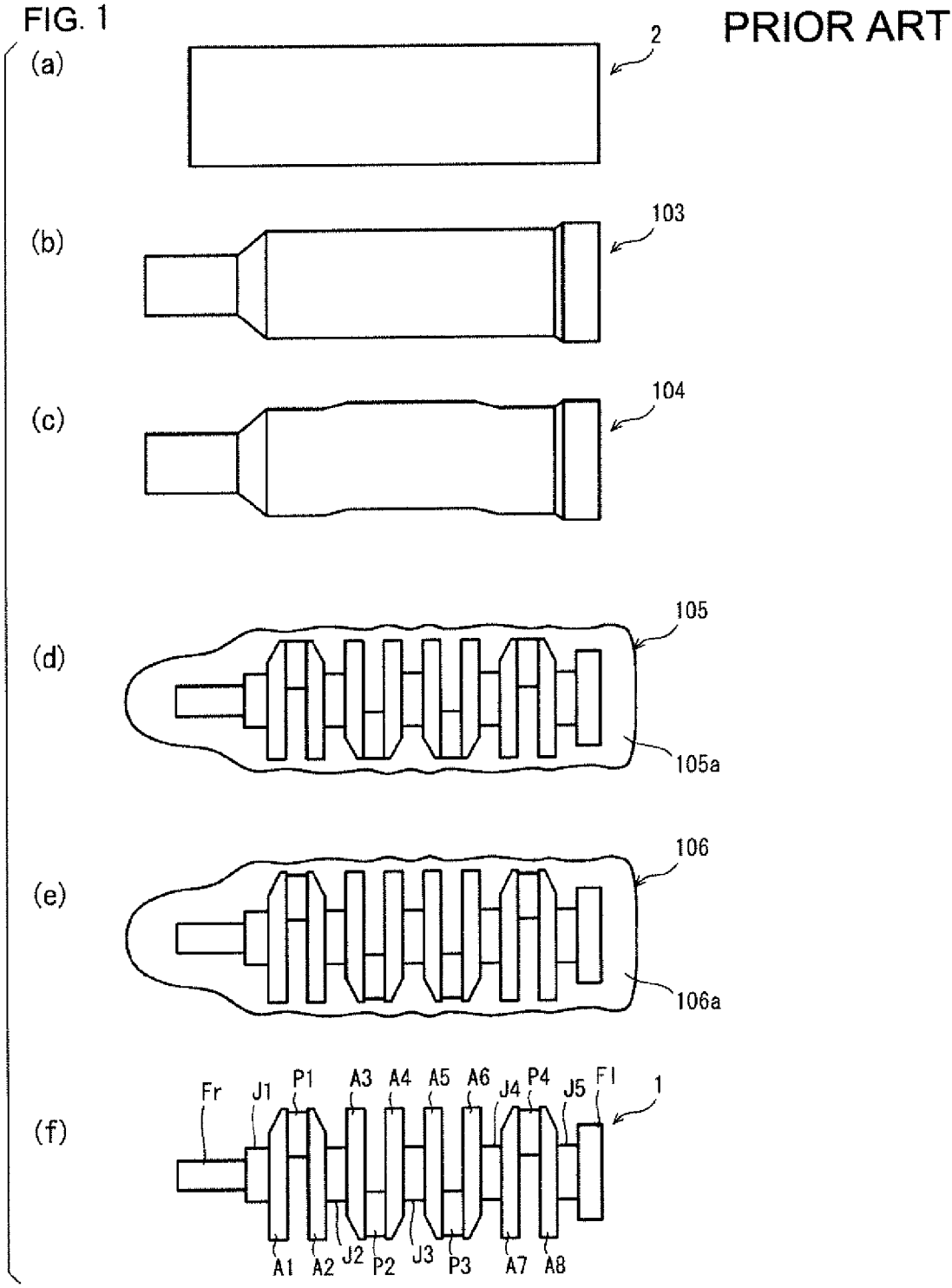
FIG. 1 is a schematic diagram illustrating a typical conventional process for manufacturing a forged crankshaft.
Figure 2:
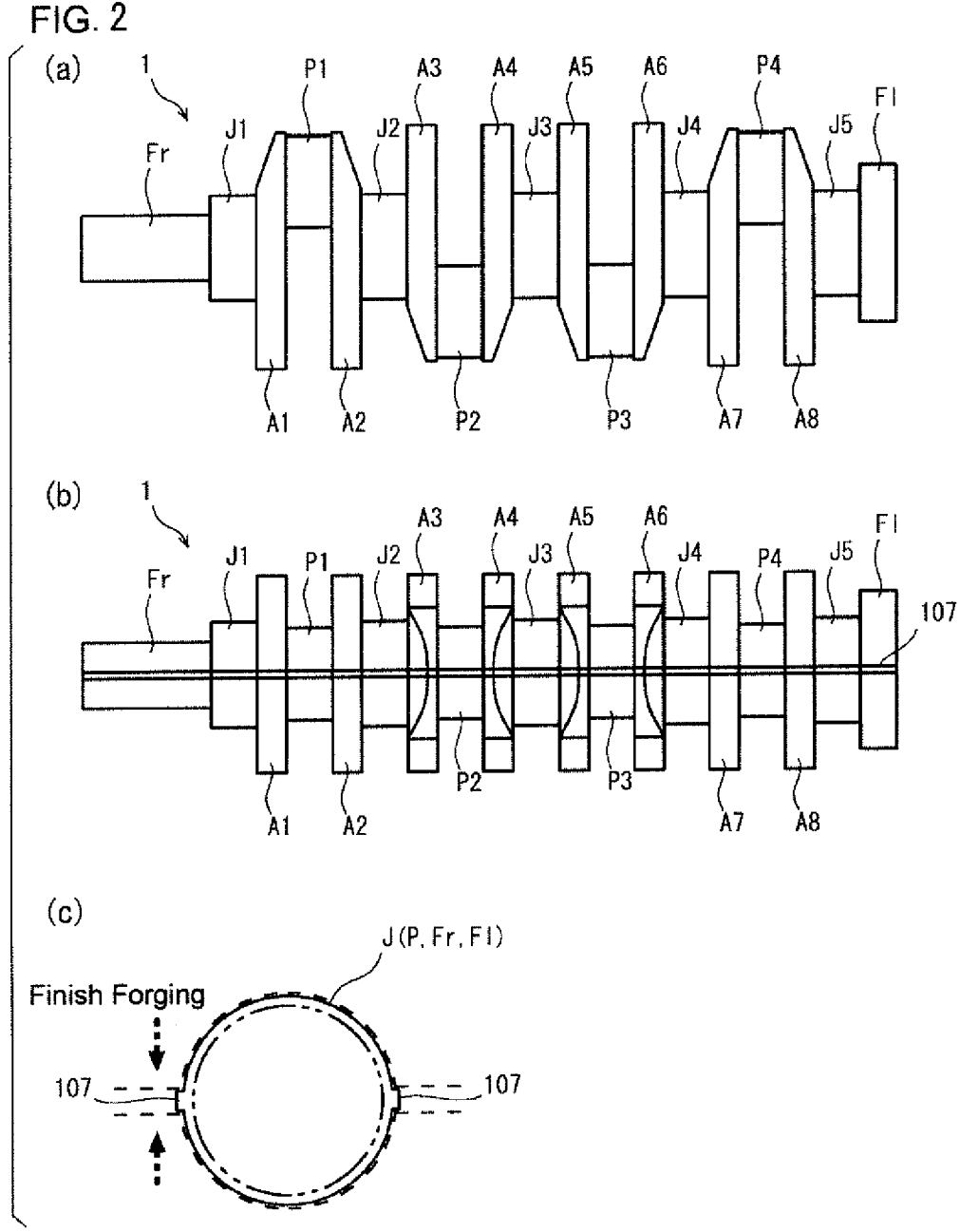
FIG. 2 is a schematic diagram illustrating an example of a conventional forged crankshaft.

As shown in FIG. 4, the preform blank 4 has a crankshaft shape that is approximate to the shape of the forged crankshaft 1 shown in FIG. 1 (f) and FIG. 3 but it is a roughly crankshaft shape as a whole. It includes: five rough journal portions J1' to J5'; four rough crank pin portions P1' to P4'; a rough front part portion Fr'; a rough flange portion Fl'; and eight rough crank arm portions (hereinafter also referred to simply as "rough arm portions") A1' to A8' that connect the rough journal portions J1' to J5' and the rough crank pin portions P1' to P4' to one another. The preform blank 4 has no flash. Hereinafter, when the rough journal portions J1' to J5', the rough crank pin portions P1' to P4', and the rough arm portions A1' to A8', of the preform blank 4, are each collectively referred to, a reference character "J'" is used for the rough journal portions, a reference character "P'" for the rough crank pin portions, and a reference character "A'" for the rough arm portions.

The blank for finish forging 5 is formed from the preform blank 4 described above using the forming apparatus, details of which will be provided later. It includes: five rough journal portions J1" to J5"; four rough crank pin portions P1" to P4", a rough part portion Fr"; a rough flange portion Fl"; and eight rough crank arm portions (hereinafter also referred to simply as "rough arm portions") A1" to A8" that connect the rough journal portions J1" to J5" and the rough crank pin portions P1" to P4" to one another. The blank for finish forging 5 has no flash. Hereinafter, when the rough journal portions J1" to J5", the rough crank pin portions P1" to P4", and the rough arm portions A1" to A8", of the blank for finish forging 5, are each collectively referred to, a reference character "J'''" is used for the rough journal portions, a reference character "P'''" for the rough crank pin portions, and a reference character "A'''" for the rough arm portions.

The blank for finish forging 5 has a shape that is generally in agreement with the shape of the crankshaft (forged final product), and it corresponds to a portion of the block forged blank 105 shown in FIG. 1(d), from which the flash 105a is removed. Specifically, the rough journal portions J''' of the blank for finish forging 5 have an axial length equal to that of the journals J of the forged crankshaft having the final shape. The rough crank pin portions P''' of the blank for finish forging 5 have an axial length equal to that of the crank pins P of the forged crankshaft having the final shape, and have an amount of eccentricity in an eccentric direction perpendicular to the axial direction also equal to that of the crank pins P of the forged crankshaft. The rough arm portions A''' of the blank for finish forging 5 have an axial thickness equal to that of the arms A of the forged crankshaft having the final shape.

Meanwhile, the rough journal portions J' of the preform blank 4 have an axial length equal to that of the rough journal portions J''' of the blank for finish forging 5, i.e., that of the journals J of the forged crankshaft. The rough crank pin portions P' of the preform blank 4 have an axial length equal to that of the rough crank pin portions P''' of the blank for finish forging 5, i.e., that of the crank pins P of the forged crankshaft, but they have a smaller amount of eccentricity than that of the rough crank pin portions P''' of the blank for finish forging 5. The rough arm portions A' of the preform blank 4 have an axial thickness greater than that of the rough arm portions A''' of the blank for finish forging 5, i.e., that of the arms A of the forged crankshaft. In brief, compared to the blank for finish forging 5 (the forged crankshaft having the final shape), the preform blank 4 has an overall length that is relatively long by the additional thickness of the rough arm portions A', and it has a relatively small amount of eccentricity of the rough crank pin portions P'. Thus, the preform blank 4 has a relatively gentle crankshaft shape.

Strictly speaking, though, the blank for finish forging 5 has such a configuration that, with respect to the final shape of the forged crankshaft, the rough arm portions A''' is made slightly thinner and therefore the axial lengths of the rough journal portions J''' and the rough crank pin portions P''' are accordingly slightly greater. This is intended to ensure that the blank for finish forging 5 can be easily received by the dies when finish forging is performed and thereby prevent the occurrence of scoring. Correspondingly, the preform blank 4, too, has such a configuration that, with respect to the final shape of the forged crankshaft, the axial lengths of the rough journal portions J' and the rough crank pin portions P' are slightly greater.

2-2. Manufacturing Process

FIG. 5 is a schematic diagram illustrating the manufacturing process of the forged crankshaft of the present invention. As shown in FIG. 5, the manufacturing process of the forged crankshaft includes a first preforming step, a second preforming step, and a finish forging step, and also includes a trimming step and a coining step as necessary. Further, in a case where the placement angle of the crank pins needs to be adjusted, a twisting step is added after the trimming step.

The first preforming step is a step for forming the foregoing preform blank 4. In the first preforming step, a round billet having a circular cross section is applied as a starting material, and this round billet is heated by an induction heater or a gas atmosphere furnace and is subjected to preforming; thereby, the preform blank 4 can be formed. For example, the round billet is reduction-rolled by grooved rolls to distribute its volume in the longitudinal direction, and the resulting rolled blank is repeatedly subjected to bending (such bending is commonly also called as "preforming") in which it is partially pressed in a press from a direction perpendicular to the longitudinal direction to distribute its volume; thereby, the preform blank 4 can be formed. Also, the preform blank 4 may be formed by using the techniques disclosed in Patent Literatures 1 and 2. Furthermore, cross roll forging or fully-enclosed die forging may be employed.

The second preforming step is a step for forming the foregoing blank for finish forging 5 from the preform blank 4 by using the forming apparatus below, shown in FIG. 6. The finish forging step is a step where the blank for finish forging 5 is provided and the forged crankshaft 1 is obtained by press forging with the pair of upper and lower dies.

2-3. Forming Apparatus for Blank for Finish Forging

Figure 6:
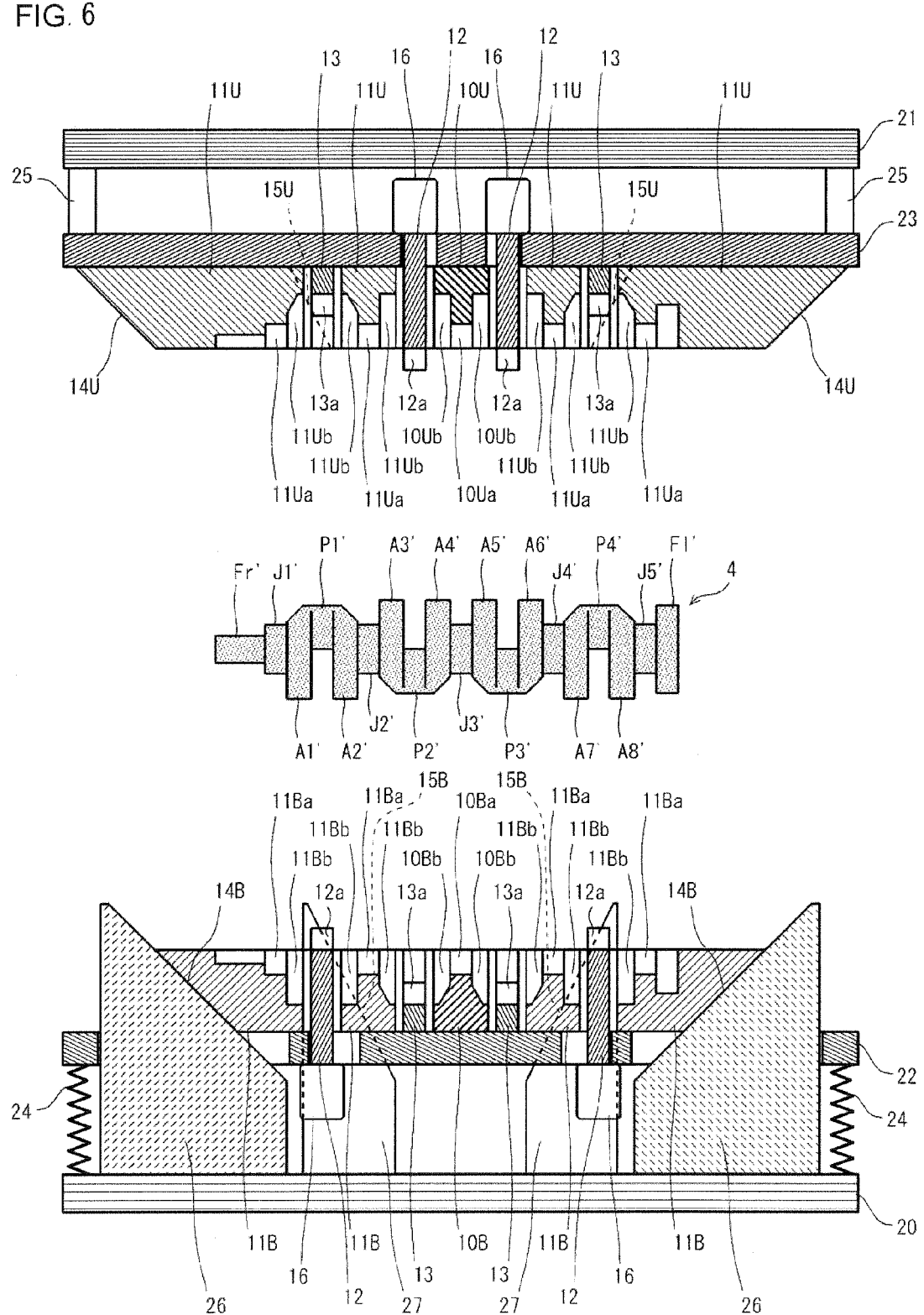
FIG. 6 is a longitudinal sectional view showing a configuration of the forming apparatus used in manufacturing the forged crankshaft of the present invention.

FIG. 6 is a longitudinal sectional view showing a configuration of the forming apparatus used in manufacturing the forged crankshaft of the present invention. FIG. 6 illustrates the forming apparatus used in the case of manufacturing a 4-cylinder 8-counterweight crankshaft, i.e., the forming apparatus for forming the blank for finish forging 5 from the preform blank 4 shown in FIG. 4.

As shown in FIG. 6, the forming apparatus is provided as a part of a press machine. It includes a stationary lower pressure pad 20 which serves as a base and an upper pressure pad 21 which is lowered by driving of a ram of the press machine. A lower die holder 22, located over the lower pressure pad 20, is resiliently supported via resilient members 24. This lower die holder 22 is vertically movable. As the resilient members 24, disc springs, coil springs, air springs, or the like may be employed, or a hydraulic spring system may be employed. An upper die holder 23 is secured under the upper pressure pad 21 via support posts 25. This upper die holder 23 is lowered together with the upper pressure pad 21 by driving the press machine (ram).

In the forming apparatus shown in FIG. 6, the preform blank 4 is placed in the dies in such a manner that the eccentric direction of the rough crank pin portions P' is in the vertical direction, with the first and fourth rough crank pin portions P1', P4' positioned in the upper side, i.e., with the second and third rough crank pin portions P2', P3' positioned in the lower side, so that the preform blank is formed into the blank for finish forging. Thus, on the lower die holder 22 and the upper die holder 23, there are mounted stationary journal dies 10U, 10B, movable journal dies 11U, 11B, and crank pin dies 12 and auxiliary crank pin dies 13, with the upper ones and the lower ones being apart from each other with respect to the axial direction of the preform blank 4, each of them forming a pair with its upper or lower mate.

The stationary journal dies 10U, 10B are disposed at locations corresponding to the location of one rough journal portions J', among the rough journal portions J', of the preform blank 4, e.g., the location of the central, third rough journal portion J3' in FIG. 6, with the upper stationary journal die mounted on the upper die holder 23 and the lower stationary journal die mounted on the lower die holder 22. Particularly, the stationary journal dies 10U, 10B, i.e., both the upper and lower ones, are completely secured to the upper die holder 23 and the lower die holder 22, respectively.

The stationary journal dies 10U, 10B have first impressions 10Ua, 10Ba, respectively, each having a semi-cylindrical shape and second impressions 10Ub, 10Bb, respectively, each located in front and back (at right and left sides in FIG. 6) of the first impressions 10Ua, 10Ba and adjacent thereto. The length of the first impressions 10Ua, 10Ba is equal to the axial length of the third rough journal portion J3" of the blank for finish forging 5. The length of the second impressions 10Ub, 10Bb is equal to the axial thickness of the rough arm portions A" (the fourth and fifth rough arm portions A4", A5") of the blank for finish forging 5 which connect with the rough journal portion J3" thereof.

By the lowering of the upper die holder 23 caused by driving the press machine, i.e., the downward movement of the press machine, the stationary journal dies 10U, 10B are caused to hold and retain the third rough journal portion J3' therebetween from above and below with the first impressions 10Ua, 10Ba. Concurrently, the stationary journal dies 10U, 10B are placed in a state in which the second impressions 10Ub, 10Bb, at their first impression 10Ua, 10Ba-side surfaces, are in contact with the fourth and fifth rough arm portions A4', A5', at their third rough journal portion J3'-side side surfaces, the fourth and fifth rough arm portions A4', A5' connecting with the third rough journal portion J3'.

The movable journal dies 11U, 11B are disposed at locations corresponding to the locations of the rough journal portions J' of the preform blank 4 excluding the rough journal portion J' thereof to be held by the stationary journal dies 10U, 10B. For example, in FIG. 6, they are disposed at locations corresponding to the locations of the first, second, fourth, and fifth rough journal portions J1', J2', J4', J5', with the upper ones mounted on the upper die holder 23 and the lower ones mounted on the lower die holder 22. Particularly, the movable journal dies 11U, 11B, i.e., both the upper and lower ones, are axially movable toward the stationary journal dies 10U, 10B on the upper die holder 23 and the lower die holder 22.

The movable journal dies 11U, 11B have first impressions 11Ua, 11Ba, respectively, each having a semi-cylindrical shape and second impressions 11Ub, 11Bb, respectively, each located in front and back (at right and left sides in FIG. 6) of the first impressions 11Ua, 11Ba and adjacent thereto. The length of the first impressions 11Ua, 11Ba is equal to the axial length of the first, second, fourth, and fifth rough journal portions J1", J2", J4", J5" of the blank for finish forging 5. The length of the second impressions 11Ub, 11Bb is equal to the axial thickness of the rough arm portions A" of the blank for finish forging 5 each of which connects with a corresponding one of the rough journal portions J1", J2", J4", J5" thereof.

By the lowering of the upper die holder 23 caused by driving the press machine, i.e., the downward movement of the press machine, the movable journal dies 11U, 11B are caused to hold and retain their corresponding rough journal portions J' therebetween from above and below with the first impressions 11Ua, 11Ba. Concurrently, the movable journal dies 11U, 11B are placed in a state in which the second impressions 11Ub, 11Bb, at their first impression 11Ua, 11Ba-side surfaces, are in contact with their corresponding rough arm portions A', at their rough journal portion J'-side side surfaces, the corresponding rough arm portions A' each connecting with a corresponding one of the rough journal portions J'.

Here, it is noted that the movable journal dies 11U, 11B disposed at locations corresponding to the locations of the first and fifth rough journal portions J1', J5' at opposite ends, each have an end surface that is an inclined surface 14U, 14B. In relation to this, on the lower pressure pad 20, there are provided first wedges 26 located correspondingly to the locations of the inclined surfaces 14U, 14B of the movable journal dies 11U, 11B for the first and fifth rough journal portions J1', J5'. Each of the first wedges 26 extends upward penetrating through the lower die holder 22. The inclined surfaces 14B of the lower movable journal dies 11B among the movable journal dies 11U, 11B for the first and fifth rough journal portions J1', J5', are in contact with the slopes of the first wedges 26 in the initial condition. On the other hand, the inclined surfaces 14U of the upper movable journal dies 11U are brought into contact with the slopes of the first wedges 26 by the lowering of the upper die holder 23 caused by driving the press machine, i.e., the downward movement of the press machine.

Further, the movable journal dies 11U, 11B disposed at locations corresponding to the locations of the second and fourth rough journal portions J2', J4' which are closer to the center, are provided with blocks, not shown, secured at side sections (front and rear in FIG. 6) apart from the first impressions 1111a, 11Ba and the second impressions 11Ub, 11Bb, the blocks having inclined surfaces 15U, 15B. In relation to this, on the lower pressure pad 20, there are provided second wedges 27 located correspondingly to the locations of the inclined surfaces 15U, 15B of the movable journal dies 11U, 11B for the second and fourth rough journal portions J2', J4'. Each of the second wedges 27 extends upward penetrating through the lower die holder 22. The inclined surfaces 15B of the lower movable journal dies 11B, among the movable journal dies 11U, 11B for the second and fourth rough journal portions J2', J4', are in contact with the slopes of the second wedges 27 in the initial condition. On the other hand, the inclined surfaces 15U of the upper movable journal dies 11U are brought into contact with the slopes of the second wedges 27 by the lowering of the upper die holder 23 caused by driving the press machine, i.e., the downward movement of the press machine.

Then, with the continued downward movement of the press machine, the upper movable journal dies 11U are pressed downwardly together with the lower movable journal dies 11B. This allows the movable journal dies 11U, 11B for the first and fifth rough journal portions J1', J5', i.e., both the upper and lower ones, to move axially toward the stationary journal dies 10U, 10B for the third rough journal portion J3' as their inclined surfaces 14U, 14B slide along the slopes of the first wedges 26. Concurrently, the movable journal dies 11U, 11B for the second and fourth rough journal portions J2', J4', i.e., both the upper and lower ones, are allowed to move axially toward the stationary journal dies 10U, 10B for the third rough journal portion J3' as their inclined surfaces 15U, 15B slide along the slopes of the second wedges 27. In short, the movable journal dies 11U, 11B can be individually moved axially by the wedge mechanisms.

The crank pin dies 12 and the auxiliary crank pin dies 13, which form upper and lower pairs, are disposed at locations corresponding to the locations of the rough crank pin portions P' of the preform blank 4, with the upper ones mounted on the upper die holder 23 and the lower ones mounted on the lower die holder 22. The crank pin dies 12 are disposed at locations facing inner sides of the respective rough crank pin portions P', whereas the mating auxiliary crank pin dies 13 are disposed at locations facing outer sides, opposite to the inner sides, of the respective rough crank pin portions P'. For example, the first rough crank pin portion P1' is positioned at an upper side location, and thus the crank pin die 12 therefor is mounted on the lower die holder 22 and, the auxiliary crank pin die 13 therefor is mounted on the upper die holder 23.

Particularly, all the crank pin dies 12 and the auxiliary crank pin dies 13, i.e., both the upper and lower ones, are axially movable toward the stationary journal dies 10U, 10B on the upper die holder 23 and the lower die holder 22. Furthermore, the crank pin dies 12 are movable in the eccentric direction toward the rough crank pin portions P'.

The crank pin dies 12 and the auxiliary crank pin dies 13 have impressions 12a, 13a having a semi-cylindrical shape, respectively. The length of the impressions 12a, 13a is equal to the axial length of the rough crank pin portions P''' of the blank for finish forging 5.

By the lowering of the upper die holder 23 caused by driving the press machine, i.e., the downward movement of the press machine, the crank pin dies 12 are placed in a state in which their impressions 12a receive the respective rough crank pin portions P' at their inner sides, so that the side surfaces of each crank pin dies 12 are in contact with corresponding ones of the rough arm portions A', at their rough crank pin portion P'-side side surfaces, the corresponding ones of the rough arm portions A' connecting with a corresponding one of the rough crank pin portions P'.

Then, the crank pin dies 12 and the auxiliary crank pin dies 13 are pressed downwardly together with the continued downward movement of the press machine. Accordingly, with the axial movement of the movable journal dies 11U, 11B as described above, the crank pin dies 12 and the auxiliary crank pin dies 13 are moved axially along with them toward the stationary journal dies 10U, 10B for the third rough journal portion J3'. The movement of the crank pin dies 12 in the eccentric direction is accomplished by driving the hydraulic cylinder 16 coupled to the crank pin dies 12.

It is noted that the axial movement of the crank pin dies 12 and the auxiliary crank pin dies 13 may be forcibly caused using a wedge mechanism similar to the one for the movable journal dies 11U, 11B or a separate mechanism such as a hydraulic cylinder or a servo motor. The auxiliary crank pin dies 13 may be integral with one of their adjacent movable journal dies 11U, 11B.

In the initial condition shown in FIG. 6, spaces are provided between the axially arranged stationary journal dies 10U, 10B and the movable journal dies 11U, 11B and their corresponding crank pin dies 12 and the auxiliary crank pin dies 13, so as to allow the axial movement of the movable journal dies 11U, 11B as well as that of the crank pin dies 12 and the auxiliary crank pin dies 13. The size of the spaces represents the difference between the thickness of the rough arm portions A'' of the blank for finish forging 5 and the thickness of the rough crank arm portions A' of the preform blank 4.

Now, descriptions are given of how the blank for finish forging is formed using the thus configured forming apparatus.

Figure 7:
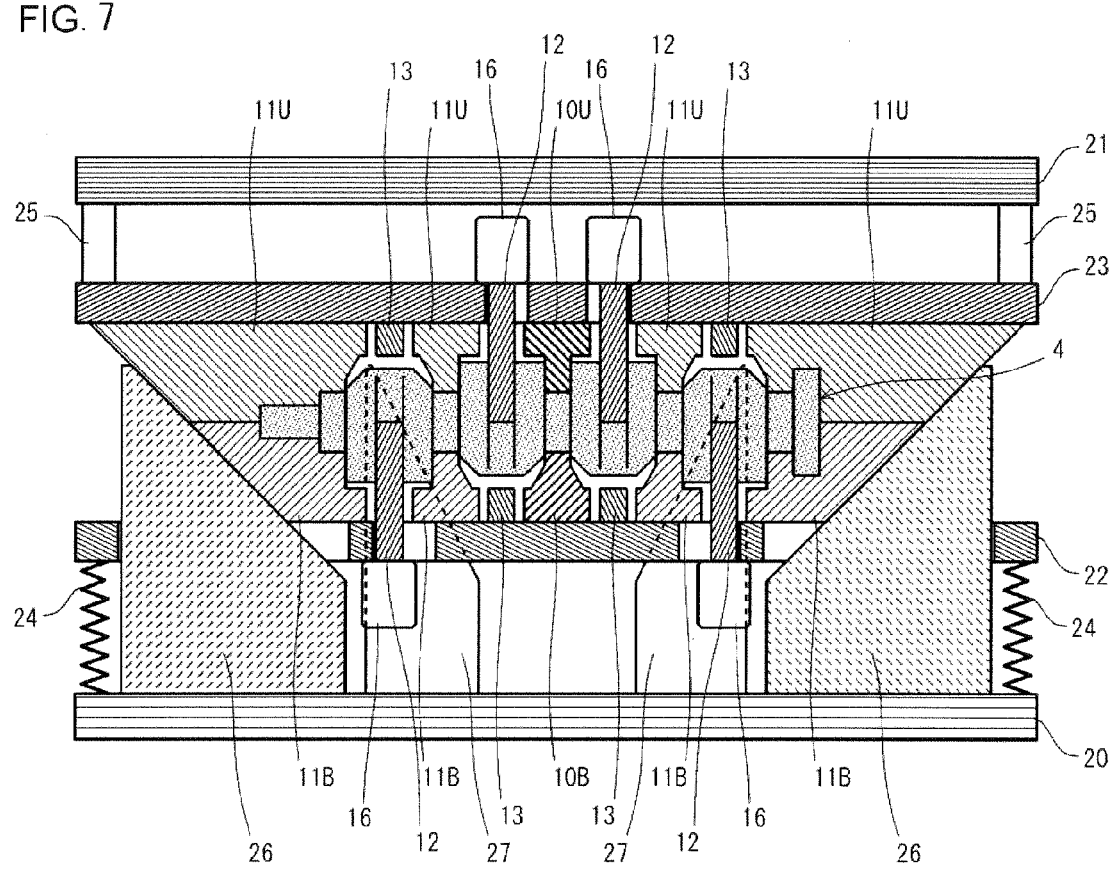
FIG. 7 is a longitudinal sectional view illustrating a method for forming the blank for finish forging using the forming apparatus shown in FIG. 6, with a forming state at an initial state shown therein.
Figure 8:
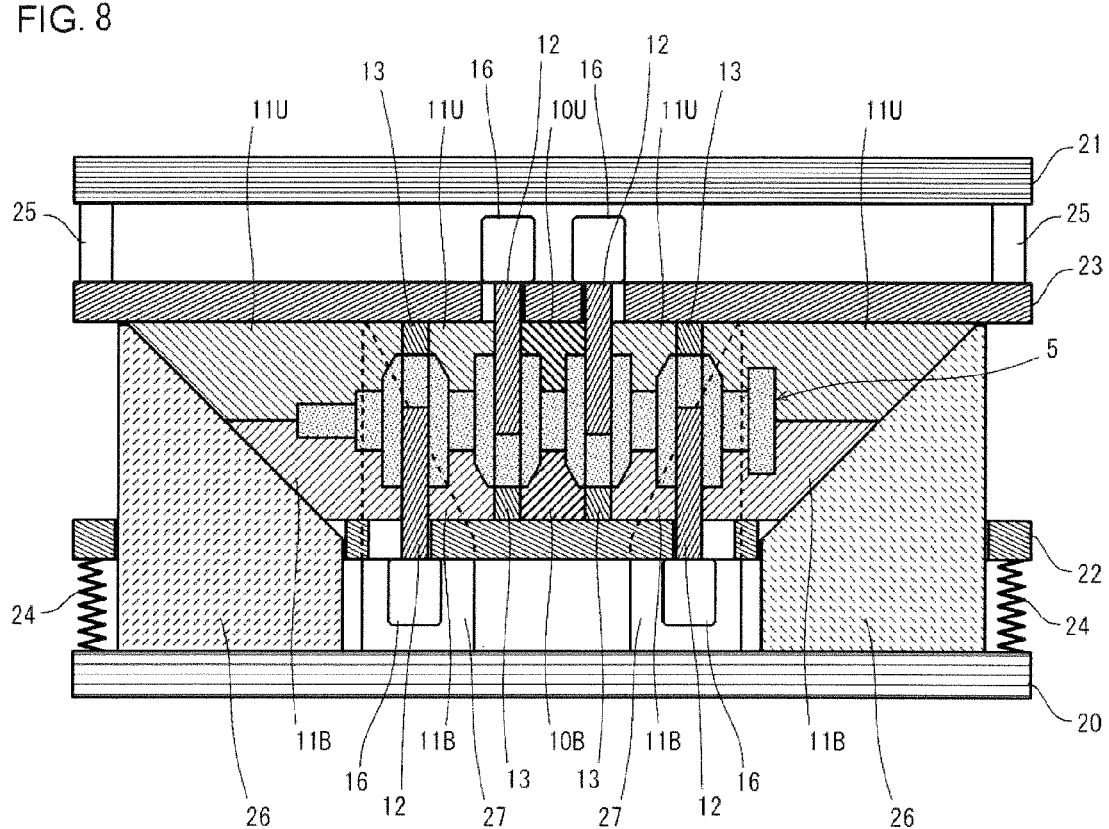
FIG. 8 is a longitudinal sectional view illustrating the method for forming the blank for finish forging using the forming apparatus shown in FIG. 6, with a forming state at a completion shown therein.

FIG. 7 and FIG. 8 are longitudinal sectional views illustrating the method for forming the blank for finish forging using the forming apparatus shown in FIG. 6, with FIG. 7 showing a state at an initial stage of forming and FIG. 8 showing a state at a completion of forming.

The preform blank 4 is placed in the lower stationary journal die 10B, the lower movable journal dies 11B, and the lower crank pin dies 12 and the lower auxiliary crank pin dies 13 which are shown in FIG. 6, and then lowering of the press machine is started. Then, as shown in FIG. 7, firstly, the upper stationary journal die 10U and the upper movable journal dies 11U are brought into contact with the respective lower stationary journal die 10B and lower movable journal dies 11B.

Thus, the preform blank 4 is placed in a state in which the rough journal portions J' are held by the stationary journal dies 10U, 10B and the movable journal dies 11U, 11B from above and below, and the rough crank pin portions P', at their inner sides, are contacted by the crank pin dies 12. In this state, in the preform blank 4, the rough arm portions A', at their rough journal portion J'-side side surfaces, are in contact with the stationary journal dies 10U, 10B and the movable journal dies 11U, 11B, and, at their rough crank pin portion P'-side side surfaces, are in contact with the crank pin dies 12. Also, in this state, the inclined surfaces 14U, 14B of the movable journal dies 11U, 11B for the first and fifth rough journal portions J1', J5' are in contact with the slopes of the first wedges 26, and the inclined surfaces 15U, 15B of the movable journal dies 11U, 11B for the second and fourth rough journal portions J2', J4' are in contact with the slopes of the second wedges 27.

In this state, the lowering of the press machine is continued. Accordingly, the inclined surfaces 14U, 14B of the movable journal dies 11U, 11B for the first and fifth rough journal portions J1', J5' slide along the slopes of the first wedges 26, and by this rough journal portions J1', J5' slide along the slopes of the first wedges 26, and by this wedge mechanism, these movable journal dies 11U, 11B are allowed to move axially toward the stationary journal dies 10U, 10B for the third rough journal portion J3'. Concurrently, the inclined surfaces 15U, 15B of the movable journal dies 11U, 11B for the second and fourth rough journal portions J2', J4' slide along the slopes of the second wedges 27, and by this wedge mechanism, these movable journal dies 11U, 11B are allowed to move axially toward the stationary journal dies 10U, 10B for the third rough journal portion J3'. By such axial movement of the movable journal dies 11U, 11B caused by the wedge mechanism, the crank pin dies 12 and the auxiliary crank pin dies 13 are also allowed to move axially toward the stationary journal dies 10U, 10B for the third rough journal portion J3'.

Accordingly, the spaces between the stationary journal dies 10U, 10B and the movable journal dies 11U, 11B and their corresponding crank pin dies 12 and auxiliary crank pin dies 13 are gradually reduced, and finally they disappear. In this process, in the preform blank 4, the rough arm portions A' are axially compressed by the stationary journal dies 10U, 10B, the movable journal dies 11U, 11B, and the crank pin dies 12 while the axial lengths of the rough journal portions J' and the rough crank pin portions P' are maintained, so that the thickness of the rough arm portions A' is reduced to the thickness of the rough arm portions A'' of the blank for finish forging 5 (see FIG. 8).

Also, in response to the axial movement of the movable journal dies 11U, 11B as well as that of the crank pin dies 12 and the auxiliary crank pin dies 13, the hydraulic cylinders 16 for the crank pin dies 12 is driven. Accordingly, the crank pin dies 12 press the respective rough crank pin portions P' of the preform blank 4 in the eccentric direction. Thus, the rough crank pin portions P' of the preform blank 4 are displaced in the eccentric direction, and the amount of eccentricity is increased to the amount of eccentricity of the rough crank pin portions P''' of the blank for finish forging 5 (see FIG. 8).

In this manner, it is possible to form, from the preform blank 4 without a flash, the blank for finish forging 5 without a flash, which has a shape generally in agreement with the shape of the forged crankshaft (forged final product) having thin crank arms A. By using such a blank for finish forging 5 without a flash in finish forging and applying finish forging thereto, it is possible to obtain the final shape of the forged crankshaft including the contour shape of crank arms although some minor amount of flash is generated. Therefore, forged crankshafts for multiple cylinder engines can be manufactured with high material utilization and also with a high dimensional accuracy regardless of their shapes. If, at the stage of preparing the preform blank, portions to be formed into balance weights are shaped in its arm portions, it is even possible to manufacture a forged crankshaft having balance weights.

In the forming apparatus shown in FIGS. 6 to 8, the inclined surfaces 14U, 14B of the movable journal dies 11U, 11B for the first rough journal portion J1' plus the slope of the first wedge 26 that is in contact therewith and the inclined surfaces 14U, 14B of the movable journal dies 11U, 11B for the fifth rough journal portion J5' plus the slope of the first wedge 26 that is in contact therewith are angled in a reverse relationship relative to a vertical plane. Also, the inclined surfaces 15U, 15B of the movable journal dies 11U, 11B for the second rough journal portion J2' plus the slope of the second wedge 27 that is in contact therewith and the inclined surfaces 15U, 15B of the movable journal dies 11U, 11B for the fourth rough journal portion J4' plus the slope of the second wedge 27 that is in contact therewith are angled in a reverse relationship relative to a vertical plane. Furthermore, the angle of the slopes of the first wedges 26 (the angle of the inclined surfaces 14U, 14B of the movable journal dies 11U, 11B for the first and fifth rough journal portions J1', J5') is greater than the angle of the slopes of the second wedges 27 (the angle of the inclined surfaces 15U, 15B of the movable journal dies 11U, 11B for the second and fourth rough journal portions J2', J4'). The purpose of varying, for each of the movable journal dies 11U, 11B, the wedge angle of the wedge mechanism, which causes the axial movement of the movable journal dies 11U, 11B, is to ensure that the rate of deformation at which the rough arm portions A' are axially compressed to reduce the thickness thereof can be constant for all the rough arm portions A'.

In the preform blank 4 which is to be processed by the forming apparatus shown in FIGS. 6 to 8, the rough journal portions J' have a cross-sectional area that is equal to or greater than that of the rough journal portions J" of the blank for finish forging 5, i.e., that of the journals J of the forged crankshaft. Likewise, the rough crank pin portions P' of the preform blank 4 have a cross-sectional area that is equal to or greater than that of the rough crank pin portions P''' of the blank for finish forging 5, i.e., that of the crank pins P of the forged crankshaft. Even when the cross-sectional area of the rough journal portions J' of the preform blank 4 is greater than the cross-sectional area of the rough journal portions J" of the blank for finish forging 5 and the cross-sectional area of the rough crank pin portions P' of the preform blank 4 is greater than the cross-sectional area of the rough crank pin portions P''' of the blank for finish forging 5, the cross-sectional area of the rough journal portions J' can be reduced to the cross-sectional area of the rough journal portions J" of the blank for finish forging 5 by the holding and retaining of the rough journal portions J' by the stationary journal dies 10U, 10B and the movable journal dies 11U, 11B, and by the subsequent axial movement of the movable journal dies 11U, 11B; and the cross-sectional area of the rough crank pin portions P' can be reduced to the cross-sectional area of the rough crank pin portions P''' of the blank for finish forging 5 by the axial movement and the movement in the eccentric direction of the crank pin dies 12.

An issue to be addressed regarding the forming of the blank for finish forging described above is local formation of fin flaws. The following describes how fin flaws are formed and how they can be prevented.

Figure 9:
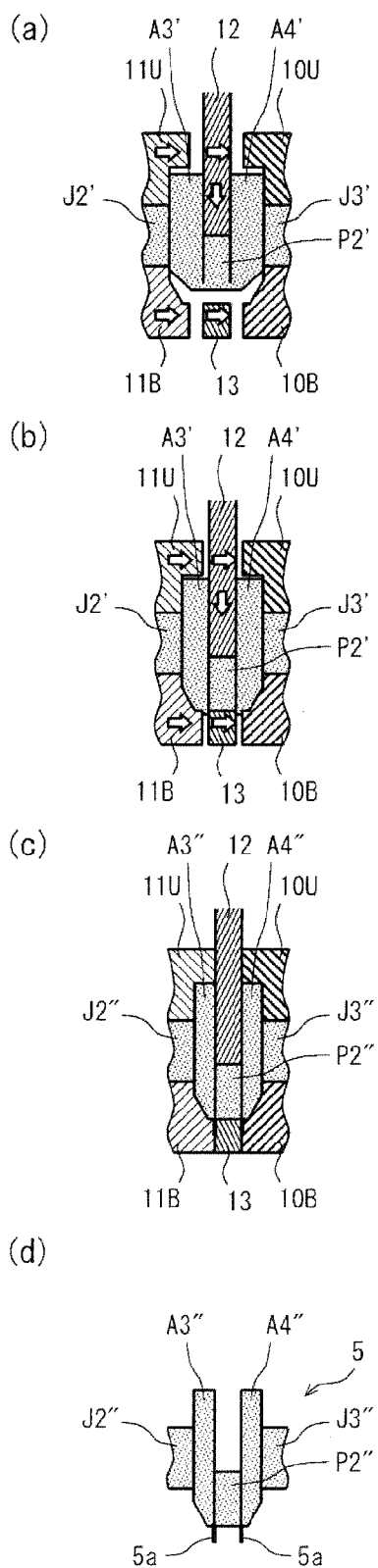
FIG. 9 is an explanation drawing illustrating how fin flaws occur in forming the blank for finish forging using the forming apparatus of the present invention.
Figure 10:
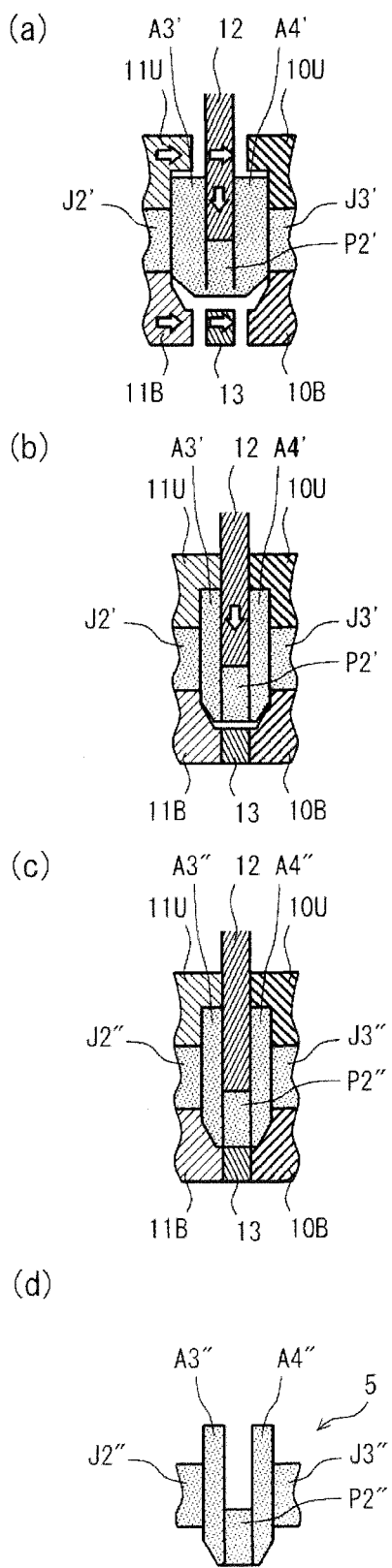
FIG. 10 is an explanation drawing illustrating how fin flaws are prevented by taking a measure in forming the blank for finish forging using the forming apparatus of the present invention.

FIG. 9 is an explanation drawing illustrating how fin flaws occur in forming the blank for finish forging using the forming apparatus of the present invention. FIG. 10 is an explanation drawing illustrating how fin flaws are prevented by taking a measure. In FIGS. 9 and 10, (a) shows a state at an initial stage of forming; (b) shows a state during the process of forming; (c) shows a state at the completion of forming; and (d) shows the blank for finish forging removed from the forming apparatus after the completion of forming.

As shown in FIG. 9(a), upon the start of the forming operation, the movable journal dies 11U, 11B move axially, and the crank pin dies 12 and the auxiliary crank pin dies 13 move axially and in the eccentric direction. Then, as shown in FIG. 9(b), if the rough crank pin portions P' in the process of eccentric deformation reach the auxiliary crank pin dies 13 before the completion of the axial movement of the movable journal dies 11U, 11B and the crank pin dies 12 and the auxiliary crank pin dies 13, i.e., before the spaces between the stationary journal dies 10U, 10B and the movable journal dies 11U, 11B and their corresponding crank pin dies 12 and auxiliary crank pin dies 13, are filled, the fillings of the rough crank pin portions P' flow into the spaces between the auxiliary crank pin dies 13 and their corresponding stationary journal dies 10U, 10B and movable journal dies 11U, 11B. Although the fillings that have flowed thereinto are thinned with the progress of the forming operation, they remain there even after the forming operation is completed as shown in FIG. 9(c). Thus, as shown in FIG. 9(d), fin flaws 5a, coming out of the rough crank pin portions P''' of the blank for finish forging 5, are formed locally at the boundaries with adjacent rough arm portions A''.

In the subsequent finish forging step, the fin flaws 5a will be struck into the finished product, resulting in overlaps. Therefore, in order to ensure product quality, it is necessary to prevent the formation of fin flows.

One measure to prevent the formation of fin flaws may be to control the movement of the crank pin dies 12 in the eccentric direction so that the rough crank pin portions P' in the process of eccentric deformation reach the auxiliary crank pin dies 13 after the spaces between the stationary journal dies 10U, 10B and the movable journal dies 11U, 11B and their corresponding crank pin dies 12 and auxiliary crank pin dies 13 are filled. Specifically, the movement of the crank pin dies 12 in the eccentric direction may be completed after the axial movement of the movable journal dies 11U, 11B and the crank pin dies 12 and the auxiliary crank pin dies 13 is completed. For example, when the total length of movement of the crank pin dies 12 in the eccentric direction is designated as a 100% length of movement thereof, it is preferable that, at the completion of the axial movement of the movable journal dies 11U, 11B that are adjacent to the crank pin dies 12, the length of movement of the crank pin dies 12 in the eccentric direction is 90% or less (more preferably 83% or less, and even more preferably 60% or less) of the total length of movement, and thereafter, the movement of the crank pin dies 12 in the eccentric direction is completed.

That is, the forming operation is started as shown in FIG. 10(a); and then, as shown in FIG. 10(b), the axial movement of the movable journal dies 11U, 11B as well as that of the crank pin dies 12 and the auxiliary crank pin dies 13 is completed before the length of movement of the crank pin dies 12 in the eccentric direction reaches 90% of the total length of movement. Consequently, by this time, the spaces between the stationary journal die 10U, 10B and the movable journal dies 11U, 11B and their corresponding crank pin dies 12 and auxiliary crank pin dies 13 have been filled, whereas the rough crank pin portions P' in the process of eccentric deformation have not reached the auxiliary crank pin dies 13. Subsequently, along with the movement of the crank pin dies 12 in the eccentric direction, the rough crank pin portions P' reach the auxiliary crank pin dies 13, and with the completion of the movement, the forming is completed as shown in FIG. 10(c). Thus, no such problem occurs as the fillings of the rough crank pin portions P' flow into the spaces between the auxiliary crank pin dies 13 and their corresponding stationary journal dies 10U, 10B, and movable journal dies 11U, 11B. As a result, as shown in FIG. 10(d), the high-quality blank for finish forging 5 without fin flaws can be obtained.

The process of movement of the crank pin dies in the eccentric direction before the completion of the axial movement of the movable journal dies may be varied as desired. For example, the movement of the crank pin dies in the eccentric direction may be started simultaneously with the start of the axial movement of the movable journal dies or in advance of that, or conversely, it may be started after the axial movement of the movable journal dies has progressed to some extent. Also, the movement of the crank pin dies in the eccentric direction may be stopped temporarily, after its start, at positions a certain distance away from their initial positions, and it may be resumed after the completion of the axial movement of the movable journal dies.

The present invention is not limited to the embodiment described above, and various modifications may be made without departing from the spirit and scope of the present invention. For example, the mechanism for causing the movable journal dies to move axially is not limited to the above embodiment using the forming apparatus shown in FIG. 6, in which a wedge mechanism of a press machine is employed. Alternatively, a link mechanism may be employed, or a hydraulic cylinder or a servo motor may be employed in place of a press machine. Furthermore, the mechanism for causing the crank pin dies to move in the eccentric direction is not limited to a hydraulic cylinder, and it may be a servo motor.

Furthermore, the forming apparatus shown in FIG. 6 has such a configuration that the upper die holder is secured to the upper pressure pad while the lower die holder is resiliently supported on the lower pressure pad on which the wedges are installed and the upper and lower movable journal dies are allowed to move by the wedges. but alternatively, the functions of the upper section and the lower section may be reversed. The configuration may also be such that the upper and lower die holders are resiliently supported on the respective pressure pads, and that wedges are installed on both pressure pads so that the upper and lower movable journal dies are caused to move by their corresponding wedges.

Furthermore, in the forming apparatus shown in FIG. 6, the auxiliary crank pin dies are movable only axially, but additionally, they may be made to be movable also in a direction opposite to the eccentric direction, so that the crank pin dies and the auxiliary crank pin dies can hold and retain the rough crank pin portions P' therebetween from above and below and meanwhile move in the eccentric direction cooperatively with each other.

EXAMPLES

To verify the advantages of the present invention, the manufacturing process shown in FIG. 5 and including the performing step in which the forming apparatus shown in FIG. 6, was performed by using round billets with a diameter of 61 mm and a length of 600 mm as a starting material; thereby, the forged 4-cylinder 8 counterweight crankshafts were manufactured. Each of manufactured forged crankshafts had the journals of which outer diameter were 49 mm and the crank pins of which outer diameter were 46 mm. Further, for comparison, the manufacturing process shown in FIG. 1 was performed to thereby manufacture the forged crankshaft with flash lines. In the above cases, a carbon steel containing S of a steel type A shown in Table 1 were used as a starting material in an example of the present invention, and a carbon steel containing S of two steel types B, C shown in Table 1 were used as a stating material in a comparative example.

TABLE 1

| Steel type | Element composition [% by mass] (Residuals: Fe and impurities) | | | | | |
|---|---|---|---|---|---|---|
| | C | Si | Mn | S | Cr | V |
| A | 0.48 | 0.50 | 1.10 | 0.07 | 0.12 | 0.10 |
| B | 0.38 | 0.52 | 1.25 | 0.03 | 0.13 | — |
| C | 0.48 | 0.50 | 1.45 | 0.07 | 0.15 | 0.10 |

The journals and the crank pins were cut out from the manufactured forged crankshaft and their respective outer circumferences were processed by cutting work; thereby, test samples each having a diameter of 44 mm corresponding to the designed outer diameter and having a thickness of 10 mm are manufactured. Then, the following two evaluation tests were conducted.

For the first evaluation test, test pieces of 20 mm square were taken out from outer circumferential surfaces of the journal and the crank pin, which were respectively located in the position (position indicated by symbol X in FIG. 3(c)) corresponding to a parting surface of a die of the test sample and in the position (position indicated by symbol Y in FIG. 3(c)) corresponding to a die bottom of a die of the test sample, and the surfaces of the test pieces were grinded and thereafter a microscopic observation was performed on the surfaces. From this microscopic observation, area rates x, y of sulfide in respective positions on the surfaces are calculated. At this time, the microscopic observation was performed at 400-fold magnification across the whole area of the surfaces of the test pieces, and an image analysis was conducted for each vision to recognize an area occupied by a MnS inclusion; thereby, area rates of sulfide was calculated. Then, the area rates of sulfide under eight visions were selected from the higher area rates and their mean values were determined as the area rates x, y of sulfide in each of the positions. Thereafter, a ratio of the area rate x of sulfide to the area rate y of sulfide in each of the positions was calculated from the area rates x, y of sulfide obtained from above.

For the second evaluation test, the test samples for the journal and the crank pin were used. The respective outer circumferences of the journal and the crank pin were subjected to induction heating and thereafter the test samples were respectively immersed for 24 hours in hydrochloric acid solution, the density of which is 4.1%. The outer circumferential surfaces located in the position (position indicated by symbol X in FIG. 3(c)) corresponding to the parting surface of the die of the test sample and in the position (position indicated by symbol Y in FIG. 3(c)) corresponding to the die bottom of the die of the test sample were observed by fluorescent magnetic particle test (MT), and existence or non-existence of cracks was checked. The second evaluation test was a test in which existence or non-existence of machined surface cracks was assumed in severer conditions.

Table 2 below collectively shows results of these two tests. Further, as an example of the test results, FIG. 11 shows microscopic observation pictures, respectively, of the example of the present invention and the comparative example in the position corresponding to the parting surface of the die for the journal. Black portions dotted in FIG. 11 are MnS inclusions.

TABLE 2

| Section | Test No. | Steel type | Portion | Area rate of sulfide | | Ratio of x to y | Existence or non-existence of cracks |
|---|---|---|---|---|---|---|---|
| | | | | x[%] (Position corresponding to parting surface) | y[%] (Position corresponding to die bottom) | | |
| Example of present invention | 1 | A | P | 0.21 | 0.16 | 1.31 | No crack |
| | 2 | A | J | 0.09 | 0.14 | 0.64 | |
| | 3 | A | P | 0.12 | 0.15 | 0.80 | |
| | 4 | A | J | 0.20 | 0.17 | 1.18 | |
| Comparative example | 5 | B | P | 0.34 | 0.18 | 1.90 | Cracks in position corresponding to parting surface |
| | 6 | B | J | 0.35 | 0.14 | 2.55 | |
| | 7 | B | P | 0.53 | 0.17 | 3.19 | |
| | 8 | B | J | 0.38 | 0.20 | 1.96 | |
| | 9 | C | P | 0.51 | 0.23 | 2.22 | |
| | 10 | C | J | 0.47 | 0.18 | 2.64 | |

Note)
"P" and "J" indicate a crank pin and a journal, respectively.

The test results shown in Table 2 and FIG. 11 reveal the following points. As shown in Table 2, test Nos. 1 to 4 are examples of the present invention and test Nos. 5 to 10 are comparative examples.

In test Nos. 1 to 4 of the examples of the present invention, as shown in Table 2, the area rate x of sulfide in the position corresponding to the parting surface ranges from 0.09% to 0.21%, and the area rate y of sulfide in the position corresponding to the die bottom ranges from 0.14% to 0.17%. Even the maximum ratio x/y of the area rate x to the area rate y is 1.31. In addition, no crack is generated in each case. Moreover, in the position corresponding to the parting surface, MnS inclusions are moderately dotted as shown in FIG. 11.

On the other hand, in test Nos. 1 to 5 of the comparative examples, as shown in Table 2, the area rate x of sulfide in the position corresponding to the parting surface ranges from 0.34% to 0.53%, and the area rate y of sulfide in the position corresponding to the die bottom ranges from 0.14% to 0.23%. Even the minimum ratio x/y of the area rate x to the area rate y is 1.90. Further, in all of the tests, no crack is generated in the position corresponding to the die bottom while cracks are generated in the position corresponding to the parting surface. Furthermore, as shown in FIG. 11, in the position corresponding to the parting surface, MnS inclusions are present in a congested state.

Thus, in a case where the ratio x/y of the area rate x of sulfide to the area rate y of sulfide is equal to or lower than 1.5 even if variations are allowed, the followings were revealed: MnS inclusions were moderately dotted while not being present in a congested state; susceptibility to cracking was low; and no machined surface cracks was generated.

INDUSTRIAL APPLICABILITY

The present invention can be effectively applied to a forged crankshaft manufactured by hot forging, in particular, to a forged crankshaft for a multiple cylinder engine.

REFERENCE SIGNS LIST

1: forged crankshaft, J, J1 to J5: journals,
P, P1 to P4: crank pins, Fr: front part,
F1: flange, A, A1 to A8: crank arms,
2: billet,
4: preform blank,
J', J1' to J5': rough journal portions of preform blank,
P', P1' to P4': rough crank pin portions of preform blank,
Fr': rough front part portion of preform blank,
F1': rough flange portion of preform blank, -continued A', A1' to A8': rough crank arm portions of preform blank,
5: blank for finish forging,
J", J1" to J5": rough journal portions of blank for finish forging,
P", P1" to P4": rough crank pin portions of blank for finish forging,
Fr": rough front part portion of blank for finish forging,
F1": rough flange portion of blank for finish forging,
A", A1" to A8": rough crank arm portions of blank for finish forging,
5a: fin flaw,
10U, 10B: stationary journal die,
11U, 11B: movable journal die,
12: crank pin die, 12a: impression,
13: auxiliary crank pin die, 13a: impression,
10Ua, 10Ba: first impression of stationary journal die,
10Ub, 10Bb: second impression of stationary journal die,
11Ua, 11Ba: first impression of movable journal die,
11Ub, 11Bb: second impression of movable journal die,
14U, 14B: inclined surfaces of movable journal dies for first and fifth rough journal portions,
15U, 15B: inclined surfaces of movable journal dies for second and fourth rough journal portions,
16: hydraulic cylinder,
20: lower pressure pad, 21: upper pressure pad,
22: lower die holder, 23: upper die holder,
24: resilient member, 25: support post,
26: first wedge, 27: second wedge

What is claimed is:
1. A forged crankshaft, comprising:
a carbon steel containing sulfide,
wherein in a portion corresponding to a machined outer circumferential surface of a shaft part, a ratio x/y of an area rate x of sulfide in a position corresponding to a parting surface of a die for finish forging to an area rate y of sulfide in a position corresponding to a bottom of a die impression of the die for finish forging is equal to or lower than 1.5.

2. The forged crankshaft according to claim 1 comprising the carbon steel containing C of 0.30% to 0.60% by mass and S of 0.01% to 0.30% by mass.

3. The forged crankshaft according to claim 1 being a forged crankshaft for a multiple cylinder engine.

4. A method for manufacturing the forged crankshaft according to claim 3, comprising the successive steps of:

a first preforming step for forming a preform blank having a crankshaft shape, the preform blank formed to include: rough journal portions having an axial length equal to an axial length of journals of the forged crankshaft; rough crank pin portions having an axial length equal to an axial length of crank pins of the forged crankshaft and having a smaller amount of eccentricity in an eccentric direction perpendicular to the axial direction than an amount of eccentricity of the crank pins of the forged crankshaft; and rough crank arm portions having an axial thickness greater than an axial thickness of crank arms of the forged crankshaft;

a second preforming step for forming a blank for finish forging by using a forming apparatus, the forming apparatus including stationary journal dies, movable journal dies, and crank pin dies:

the stationary journal dies disposed at locations corresponding to a location of one of the rough journal portions of the preform blank, and the stationary journal dies configured to hold and retain the rough journal portion therebetween in the eccentric direction perpendicular to the axial direction, while being in contact with side surfaces of corresponding ones of the rough crank arm portions, the corresponding ones of the rough crank arm portions connecting with the rough journal portion;

the movable journal dies disposed at locations corresponding to locations of the rough journal portions excluding the rough journal portion to be held by the stationary journal dies, and the movable journal dies configured to hold and retain the rough journal portions therebetween in the eccentric direction perpendicular to the axial direction, and configured to move axially toward the stationary journal dies, while being in contact with side surfaces of corresponding ones of the rough crank arm portions, the corresponding ones of the rough crank arm portions each connecting with a corresponding one of the rough journal portions; and the crank pin dies disposed at locations corresponding to locations of the rough crank pin portions, and the crank pin dies configured to be brought into contact with the respective rough crank pin portions at inner sides thereof, and configured to move axially toward the stationary journal dies and in the eccentric direction perpendicular to the axial direction while being in contact with side surfaces of corresponding ones of the rough crank arm portions, the corresponding ones of the rough crank arm portions each connecting with a corresponding one of the rough crank pin portions, in the second preforming step where the rough journal portions are held and retained by the stationary journal dies and the movable journal dies, the rough crank pin portions are contacted by the crank pin dies, the movable journal dies are moved axially, and the crank pin dies are moved axially and in the eccentric direction, thereby compressing the rough crank arm portions in the axial direction so as to reduce the thickness thereof to the thickness of the crank arms of the forged crankshaft, and pressing the rough crank pin portions in the eccentric direction so as to increase the amount of eccentricity thereof to the amount of eccentricity of the crank pins of the forged crankshaft; and a finish forging step for finish forging the blank for finish forging by using a pair of upper and lower dies to form a finished blank in which a final shape of the forged crankshaft is formed.

* * * * *